United States Patent

[11] 3,579,861

[72] Inventor Thomas E. Hallett
  Bainbridge Island, Wash.
[21] Appl. No. 797,181
[22] Filed Feb. 6, 1969
[45] Patented May 25, 1971
[73] Assignee BRD Inc.
  Bainbridge Island, Wash.

[54] SINGLE-CHANNEL ELECTRONIC QUESTION-RESPONSE SYSTEM
  12 Claims, 2 Drawing Figs.
[52] U.S. Cl. .................................................. 35/48R, 35/9
[51] Int. Cl. ................................................... G09b 5/00
[50] Field of Search ..................................... 35/48, 9.1, 8

[56] References Cited
  UNITED STATES PATENTS
  3,300,876  1/1967  Johannsen .................... 35/48
  3,314,172  4/1967  Boyett ......................... 35/48
  3,399,469  9/1968  Nisbet ......................... 35/48

Primary Examiner—Robert W. Michell
Assistant Examiner—J. H. Wolfe
Attorney—Christensen, Sanborn and Matthews ABSTRACT: The teaching response system disclosed entails a control unit used by an instructor and a plurality of response unit used by individual students. The correct answer to a question is selected on a multiposition switch in the control unit and the students select their answers on similar multiposition switches in the response units. A timed correct answer signal is transmitted to the response units, wherein the students' answers are individually compared with the indicated correct answer and individual correctness signals are derived and transmitted over a single communication channel in sequence from the respective response units back to the control unit, in which they are recorded and displayed. The system relies upon time coincidence for determining correctness of the answers selected on the response units and sequencing means for monitoring the individual correctness signals.

PATENTED MAY 25 1971

3,579,861

INVENTOR:
THOMAS E. HALLETT
BY
Christensen, Sanders & Matthews

ATTORNEYS

SINGLE-CHANNEL ELECTRONIC QUESTION-RESPONSE SYSTEM

BACKGROUND AND SUMMARY OF THE INVENTION

This invention relates to electronic question-response systems, or teaching systems, and more particularly to such a system which utilizes only a single frequency or a single wire or pair of wires in the communication link between the control unit and the response units. The latter are monitored sequentially by the control unit by means of timed signals, enabling the system to be greatly simplified compared to prior systems and reducing its cost to permit wider usage as a teaching device.

Available electronic teaching devices are generally characterized by a great deal of sophistication and complexity, rendering them expensive and available to a relatively small number of well-funded institutions. Much of the complexity of such systems has resulted from the approach taken in utilizing internal electronics whereby signals representing answers selected by the responding students are transmitted to the instructor's control unit, wherein they are compared, evaluated and recorded. In many such systems a plurality of wires are required running from each response unit to the control unit, or in the case of wireless monitoring, a plurality of frequencies are required for each response unit. Typically a different frequency is required for monitoring each response unit separately. The equipment and expense associated with transmitting and receiving a plurality of frequencies, or utilizing multistrand cables, has raised the equipment and construction costs of such systems to a point where the purchase price is prohibitive for many potential users.

It is a primary object of this invention to provide a much simpler electronic question-response system which can be manufactured and marketed at low cost, yet which supplies all of the essential functions required for effective teaching with such a unit.

Another object hereof is to provide a question-response system which utilizes a single wire or pair of wires, or a single frequency, for transmitting signals back and forth between the control and response units, thereby rendering the system less cumbersome and more usable than prior systems.

With these and other objectives and purposes in mind, the invention utilizes timed signals such as a simple pulse train, for control of the answer comparison and the monitoring phases of system operation. During the answer comparison phase a timed correct answer signal is transmitted from the control unit to the response units wherein it is compared with individual answer selection signals indicating the responders' selected answers. By a simple coincidence technique a correctness (or incorrectness) signal is derived. During the monitoring or read-back phase timed signals are utilized in a sequencing means to monitor and record the individual response unit correctness signals sequentially through the same electrical lead or frequency link used for answer comparison.

Broadly stated, the control unit comprises means for indicating the correct answer to a question, means for transmitting to the response units through a single communication link or channel a signal indicating the correct or chosen answer, means for receiving from the response units in a predetermined sequence individual signals indicating correctness of answers selected thereon, and means for displaying the individual correctness signals. Each response unit comprises means for indicating a selected answer, means for receiving the correct answer signal from the control unit, means for determining coincidence between the selected answer and the correct answer and providing a correctness indication, and means for transmitting to the control unit a correctness signal in accordance with the correctness indication.

It is important to note that the comparison function is performed in the response units, so that a simple yes or no signal is transmitted to the control unit. This simplifies both the control unit transmitting means and the correctness signal display and recording means in the control unit. The "receivers" and "transmitters" may be electrical conductors or radio frequency transmitters, for example. In the former case a single conductor or pair of conductors connects the control unit to all response units in a loop and provides both a communication link and power. In the latter case the response units can be battery operated with all units operating on a single frequency. This feature is referred to herein as "single channel" communication to identify arrangements utilizing either a single frequency or a single conductor or pair of conductors. It also includes arrangements wherein the control unit has a single input connected to the response units by individual single conductors (or pairs) but receives correctness signals individually from them in timed sequence.

The control unit preferably transmits a control signal establishing a predetermined interval and includes means responsive to the correct answer indicating means for providing a correct answer signal timed within the control interval in accordance with the indicated answer. The response units are responsive to the control signal interval, and the selected answer indicating means in each response unit includes means for selecting a time within the control interval indicating the respondent's selected answer. The coincidence determining means provides a signal indicating time coincidence (or noncoincidence) between the correct answer and the selected answer.

In the preferred system the control unit includes a pulse generator and a pulse counter having a plurality of outputs successively energized by pulses supplied by the generator. The correct answer indicating means includes a multiple-contact control switch having an output and a selectable input operable to be coupled with a selected one of the counter outputs, so that the switch output is energized at a time corresponding to the correct answer. A pulse transmitter coupled to the pulse generator transmits to the response units a series of pulses which establish the aforementioned control interval. A simple inhibit circuit or other form of "modulator" coupled between the pulse generator and the transmitter and responsive to the output of the control switch, alters or modulates the transmission of pulses at a time indicative of the correct answer.

Similarly, each response unit includes a counter adapted to receive pulses transmitted from the control unit and likewise having a plurality of outputs successively energized thereby, and also includes a response selector switch having an output and a selectable input operable to be coupled with one of the response unit counter outputs in accordance with the selected answer. A modulation detector or missing pulse detector provides in the response unit the correct answer signal, and the coincidence determining means coupled to the response selector switch output and to the detector provides the correctness indication.

For transmitting their respective correctness signals back to the control unit each response unit further includes a transmitter responsive to the correctness indication and to one output of the pulse counter therein (a different output in each response unit), to effect transmission of individual response unit correctness signals in sequence. The control unit correctness signal display means includes a plurality of inputs corresponding to the respective response units and each responsive to the correctness signal receiving means. The display means inputs are further coupled to different outputs of the pulse counter in the control unit to be rendered sequentially responsive to the receiving means in time registry with incoming correctness signals from corresponding response units.

While the words "correct" and "correctness" are utilized herein for clarity, it will be recognized that when the system is used for opinion questions or voting, the correctness of the answers is not important, but the functions of system components are the same in determining coincidence between answers selected on the control unit with those selected on the response units.

DESCRIPTION OF THE PREFERRED EMBODIMENT

Figure 1:
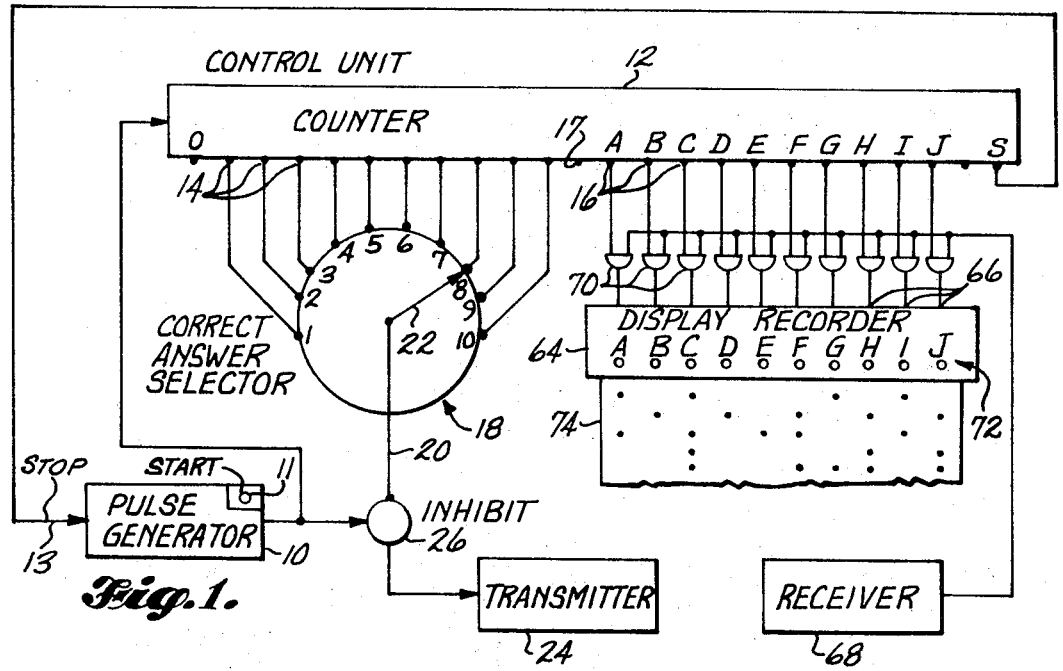
Figure 2:
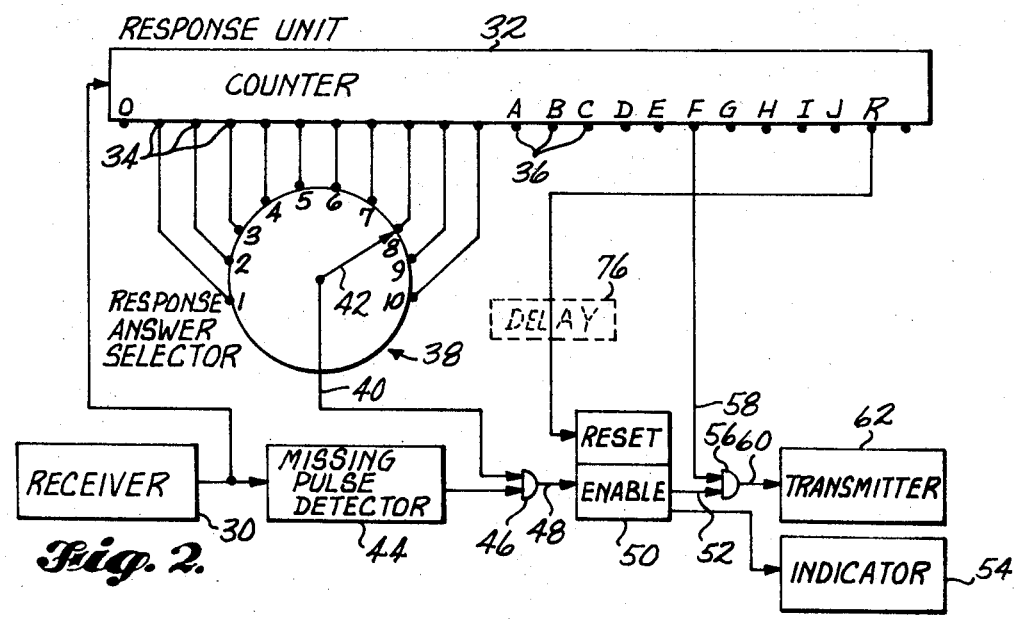

FIGS. 1 and 2 are block diagrams, respectively, of the control unit and one of a plurality of individual response units in the preferred question-response system according to the invention.

The control unit includes a pulse generator 10 supplying pulses to a counter 12 which has a plurality of outputs, including a first set of outputs 14 and a second set of outputs 16 (labeled A to J), successively and individually energized by the applied pulses. Outputs 14 are individually coupled to the contacts (numbered 1 to 10) of answer selector switch 18, which has a single output 20 and a multiposition input wiper 22 positionable in contact with any of the first set of 10 outputs 14 of the counter to indicate the correct answer. Selector output 20 is thus energized at a time corresponding to the selected answer by energization of the associated counter output—that is, on the eighth pulse count in the illustrated case.

Transmitter 24 transmits to the individual response units pulses supplied by pulse generator 10 through an inhibit circuit 26, which inhibits the transmission of a pulse upon energization of output 20 of the answer selector switch. In the illustrated case the eighth pulse is omitted from transmission, thus "modulating" the pulse train control signal during the control interval established by the length of pulse counter 12 and the pulse frequency. Pulse generator 10 is shut off by energization of the last pulse counter S connected to STOP terminal 13 of the generator, terminating transmission of pulses. Thus while answer selector switch 18 performs the mechanical function of manually indicating the correct answer to a question, it also forms a part of means for transmitting the correct answer signal to the response units.

The response unit illustrated in FIG. 2 includes a receiver 30 adapted to receive pulses from transmitter 24 of the control unit and apply them to a pulse counter 32, which is similar or identical to the counter 12 in the control unit and likewise has a plurality of outputs, including a first set of outputs 34 and a second set of outputs 36, successively energized by the received pulses in time coincidence with energization of outputs of the control counter 12. Response answer selector switch 38, similar or identical to the control unit selector switch 18, includes an output 40 and an input wiper 42 positionable on any of the contacts (numbered 1 to 10) connected to the counter outputs, to indicate the respondent's selected answer and to cause energization of selector switch output 40 upon energization of the corresponding output of pulse counter 32. The received pulses are also applied to a missing pulse detector 44, which preferably comprises a simple one-shot multivibrator with a built-in reset delay. Its reset time is longer than the interval between pulses generated by the pulse generator 10, but shorter than two such periods. That is, the detector is maintained in a set condition as long as pulses are received without a break, but when a pulse is missing the detector resets itself and provides an output which remains until just after the next pulse is received. (To avoid a bogus correctness signal initially, the first stage 0 of each counter is not utilized, so that the first pulse sets detector 44 and the second pulse is applied to the first contact of all of the selector switches.)

When the respondent selects the correct answer on switch 38, the received pulse following the omitted pulse energizes the selected output of counter 32, and hence the selector switch output 40, thereby providing a selected answer signal during the existence of the missing pulse detector output signal. For example, in the illustrated switch position the eighth pulse supplied by pulse generator 10 is omitted from transmission and its omission is detected by detector 44. The ninth pulse then energizes contact number 8 of response answer selector switch 38, thus providing the selected answer signal in time coincidence with the correct answer signal appearing at the output of missing pulse detector 44. AND gate 46 detects this coincidence and provides a correctness indication signal at output 48 to set the flip-flop 50. The flip-flop output signal at terminal 52 enables transmission of a correctness signal to the control unit at the appropriate time, as will be seen.

If the respondent's selection of an answer is incorrect, then the selected answer signal at selector switch output 40 will not coincide in time with the correct answer signal at the detector output. Hence a correctness indication would not be provided at the AND gate output 48 to set flip-flop 50.

In effect, by positioning the wiper 42 the respondent states at what time during the control time interval he believes the correct answer signal will be transmitted, and the response unit determines whether he is correct by determining whether there is time coincidence between the timed correct answer signal and the timed response answer signal. An indicator 54 responsive to flip-flop 50 is provided to indicate to the respondent whether his answer is right or wrong.

The correctness signal at output 52 of flip-flop 50 is applied to AND gate 56, which is also connected to one of the outputs 36 (A through J) of pulse counter 32 (output F in the illustrated case). Each response unit AND gate 56 is connected to a different one of the response unit counter outputs 36, which are energized in time coincidence with energization of corresponding outputs 16 of control unit counter 12. One output 17 of control unit counter 12 is not utilized, since the control unit counter receives one more pulse than the response unit counters by virtue of the omission caused by inhibit circuit 26.

In the illustrated case input signals appear at both inputs 52 and 58 of AND gate 56 upon energization of output F of response unit counter 32, thereby providing a signal at transmitter input 60 causing it to transmit a correctness signal to the control unit. Thus the system includes sequencing means whereby each response unit is allowed in sequence to transmit its correctness signal (if any) as response unit counter outputs A through J are energized in timed coincidence with energization of control unit counter outputs A through J. The response unit receivers 30 are designed to be unresponsive to transmitters 62 during a time interval between successive pulses received from transmitter 24, so that during each such time interval a correctness signal may be transmitted without affecting the other response units.

Display-recorder 64 in the control unit has a plurality of inputs 66, which are all coupled to a correctness signal receiver 68 and which are individually coupled to outputs 16 of control unit counter 12 through AND gates 70. As outputs 16 of counter 12 are energized successively, those of display-recorder inputs 66 which also receive time-coincident correctness signals from corresponding response units through receiver 68 are also energized, causing recording and display. The display-recorder preferably includes a plurality of indicating lights 72 which provide visual indications of correctness signals from each response unit, and a recording medium 74 on which correctness indications are recorded. Means not shown are included to keep indicator lights 72 on for a convenient period of time.

When 23 pulses have been supplied to the control unit counter 12, the monitoring or read-back phase of system operation has been completed and all of the correctness signals available to receiver 68 have been recorded and indicated on the display recorder 64. The 24th pulse applied to control unit counter 12 shuts off pulse generator 10 as previously noted, and the same pulse, appearing at the 23rd output R of each response unit counter 32, is used to reset the response units for the next cycle, including reset of each flip-flop 50. A delay means 76 may be provided between the reset output R and the flip-flop 50 in the case of the response unit in which the output J of counter 32 is utilized, to assure that flip-flop 50 is not reset before transmitter 62 is able to transmit the correctness signal back to the control unit. Those skilled in the art will recognize any of different suitable ways in which the system can be reset for the next question so that each counter starts at zero when operation of pulse generator 10 is again started.

From the foregoing discussion it is seen that the system operates on the basis of time coincidence in both the answer comparison phase and the monitoring phase, utilizing the simplest of available electronics.

While the invention is disclosed in its preferred and simplest form, the principles of the invention are more broadly applicable. For example, the pulse counters may and typically would have a greater number of outputs providing greater flexibility in terms of the number of selectable answer positions and to accommodate a larger number of response units. Further, a number of different answer selector switches may be provided in both the control and response units. Three selector switches could be provided, each with 10 contacts, permitting numerical answers to be given up to 999 in number. The correct answer selectors in the control unit would be coupled to the transmitter through series-connected inhibit circuits, while the respective response answer selectors in the response units would be coupled through additional AND gates and flip-flop circuits to provide a correctness signal if all three answer selector switch wipers are positioned correctly. These and other modifications within the scope of the invention as defined in the appended claims will be recognized by those skilled in the art.

I claim:

1. A single-channel electronic question-response system comprising:
   a. a control unit including means for indicating a correct answer to a question and transmitting a correct answer signal to said response units simultaneously,
   b. a plurality of response units each including means for indicating a selected answer, means for receiving said correct answer signal, and means for comparing said selected answer and correct answer to provide a correctness indication signal, and
   c. single channel communication means coupling said control unit with said response units including sequencing means for transmitting respective correctness indication signals from said response units individually to said control unit in a predetermined sequence,
   d. said control unit further including means responsive in said predetermined sequence to said respective correctness indication signals for displaying separate correctness indications corresponding thereto.

2. The system defined in claim 1 wherein said means for indicating and transmitting a correct answer signal comprises means for providing a timed control signal establishing a predetermined time interval and means for superimposing on said control signal a correct answer signal selectively timed within said interval in accordance with said correct answer.

3. The system defined in claim 2 wherein said response unit includes means responsive to said control signal, said selected answer indicating means comprises means for selecting a time within said interval indicating the selected answer, and said comparing means comprises means for determining time coincidence between said selected time and said timed correct answer signal.

4. The system defined in claim 2 wherein said means for providing a timed control signal comprises a pulse generator and a counter having a plurality of outputs successively energized by pulses from said generator; said correct answer indicating and transmitting means comprises control switch means having an output and selectable input means operable to connect said output to selected one of said counter outputs in accordance with the correct answer; and inhibit means coupled between said pulse generator and said transmitting means and responsive to the output of said control switch means to inhibit transmission of a pulse to said response units at a time indicating said correct answer.

5. The system defined in claim 4 wherein said response unit includes missing pulse detector means and a pulse counter adapted to receive pulses transmitted by said control unit and having a plurality of outputs successively energized thereby; and wherein said selected answer indicating means comprises response switch means having an output and selectable input means operable to connect said output to a selected one of said response unit pulse counter outputs in accordance with the answer selected, and said coincidence determining means is coupled to said missing pulse detector and to the response switch means output to respond to a predetermined time relationship between the missing pulse inhibited by said inhibit means and energization of the selected response unit counter output.

6. The system defined in claim 13 wherein said displaying means includes a plurality of inputs corresponding respectively to said response units and each coupled to said sequencing means; and wherein said sequencing means includes timing control means coupled to said displaying means inputs and operable to render them sequentially and individually responsive to said communication means, and in each response unit a transmission control means responsive to the timing control means in said control unit to effect transmission of the individual correctness signal of said response unit in time coincidence with responsiveness of the corresponding input of said displaying means.

7. The system defined in claim 6 wherein said timing control means includes: a pulse generator; a pulse counter having a plurality of outputs successively energized by pulses supplied by said generator; and a plurality of AND gates each having a first input coupled to said communication means, a second input coupled to one output of said counter, and an output coupled to an input of said display means; and wherein each response unit includes a pulse counter coupled to receive pulses from said control unit and having a plurality of outputs successively energized thereby; said response units having means responsively coupled to respectively different response unit counter outputs and controlled by energization thereof to transmit said correctness signal in said predetermined sequence.

8. An electronic question-response system comprising a control unit and a plurality of response units;
   a. said control unit including
      1. multiple-contact control switch means for selecting a correct answer indication,
      2. means for transmitting to said response units a correct answer signal timed in accordance with the correct answer selected on said control switch means,
      3. means for receiving from said response units signals indicating correctness of answers selected thereon, and
      4. means for displaying said correctness signals;
   b. said response units each including
      1. multiple-contact response switch means for indicating a selected answer,
      2. means coupled with said response switch means for providing a signal timed in accordance with the answer selected thereon,
      3. means for receiving said correct answer signal from said control unit,
      4. coincidence determining means for detecting time coincidence between said correct answer signal and said selected answer signal and operable to provide a correctness indication, and
      5. means for transmitting to said control unit a correctness signal in accordance with said correctness indication.

9. The system defined in claim 8 wherein said means for transmitting a timed correct answer signal includes:
   a. a pulse generator,
   b. a pulse counter coupled to receive pulses from said generator and having a plurality of outputs successively energized thereby, c. said control switch means having an output and selectable input means operable to connect said output to a selected one of said pulse counter outputs,
d. control signal output means coupled to said pulse generator and operable in response thereto to transmit to said response units a control signal defining a predetermined time interval, and
e. means interposed between said pulse generator and said control signal output means and responsive to said control switch means output to modulate said control signal upon energization of the selected pulse counter output.

10. The system defined in claim 9 wherein:
A. said correct answer receiving means including means responsive to said control signal,
b. said response switch means includes means for providing said timed selected answer signal within said predetermined time interval,
c. each response unit further includes detector means coupled to said correct signal receiving means for detecting the modulation of said control signal, and
d. said coincidence determining means is coupled to said response switch means to said detector means to determine time coincidence between said modulation and said timed selected answer signal.

11. The system defined in claim 10 wherein:
a. said control signal output means comprises means for transmitting pulses from said pulse generator to said response units,
b. said interposed modulation means comprises an inhibit circuit operable to inhibit transmission of a pulse in response to energization of the selected pulse counter output, and
c. said detector means comprises a missing pulse detector.

12. The system defined in claim 9 wherein:
a. said control signal output means comprises means for transmitting pulses from said pulse generator to said response units,
b. each response unit includes a pulse counter coupled to said correct answer signal receiving means and having a plurality of outputs successively energized by said transmitted pulses and
c. each response unit further includes means responsive to a different output of the pulse counter therein and operable to control the correctness signal transmitting means, whereby said correctness signals are transmitted in sequence to said control unit, and
d. said means for displaying correctness signals includes a plurality of inputs corresponding respectively to said response units and each coupled to said correctness signal receiving means, and means coupled to said display means inputs and respective outputs of the pulse counter of said control unit for rendering said display means inputs sequentially responsive to said receiving means upon successive energization of said pulse counter outputs.